United States Patent
Crudele et al.

(10) Patent No.: US 6,692,177 B2
(45) Date of Patent: Feb. 17, 2004

(54) STEERING SHAFT RETAINING CLIP

(75) Inventors: Walter Crudele, Middlebury, CT (US); Julio Costa, Waterbury, CT (US); Daniel J. Butkievich, Oxford, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/793,018

(22) Filed: Feb. 26, 2001

(65) Prior Publication Data

US 2002/0118994 A1 Aug. 29, 2002

(51) Int. Cl.[7] ............................................. F16D 3/16
(52) U.S. Cl. ...................... 403/12; 403/155; 464/134
(58) Field of Search .......................... 403/12, 155, 290; 464/134, 135

(56) References Cited

U.S. PATENT DOCUMENTS

| | | | |
|---|---|---|---|
| 2,322,138 A | 6/1943 | Jenny | 85/8.5 |
| 3,362,737 A | 1/1968 | Cobb | 287/189.36 |
| 3,483,888 A | 12/1969 | Wurzel | 137/539 |
| 4,364,615 A | 12/1982 | Euler | 308/236 |
| 4,900,178 A | 2/1990 | Haldric et al. | 403/24 |
| 4,924,127 A | 5/1990 | Boireau et al. | 310/90 |
| 5,358,350 A | 10/1994 | Oertle | 403/12 |
| 5,624,193 A | 4/1997 | Vogelsberger et al. | 384/517 |
| 5,964,536 A | 10/1999 | Kinoshita | 384/441 |
| 6,155,739 A | 12/2000 | Sekine et al. | 403/12 |

FOREIGN PATENT DOCUMENTS

| | | |
|---|---|---|
| JP | 11 030241 A | 2/1999 |
| JP | 11 280781 A | 10/1999 |
| JP | 2000 310232 A | 11/2000 |
| JP | 2001 099178 A | 4/2001 |

*Primary Examiner*—Lynne H. Browne
*Assistant Examiner*—Ryan M. Flandro
(74) *Attorney, Agent, or Firm*—Michael Best & Friedrich LLP

(57) ABSTRACT

A slap yoke clip has a side portion formed configured to fit over a side portion of a slap yoke and engage a nut of a transverse retaining bolt to retain the slap yoke clip on the slap yoke. An abutment portion of the slap yoke clip extends from the slap yoke clip side portion for abutting a surface of the slap yoke to prevent rotation of the slap yoke clip with respect to the slap yoke. An elastically deformable latch portion of the slap yoke clip extends from the slap yoke clip side portion, at an angle thereto, for elastically deforming when a steering shaft is laterally inserted into the slap yoke and for returning to a relatively undeformed condition after insertion of the steering shaft into the slap yoke to prevent exit of the steering shaft from the slap yoke.

7 Claims, 2 Drawing Sheets

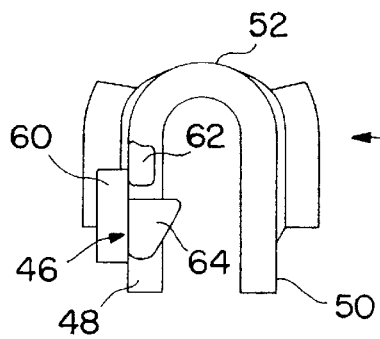
FIG. 6
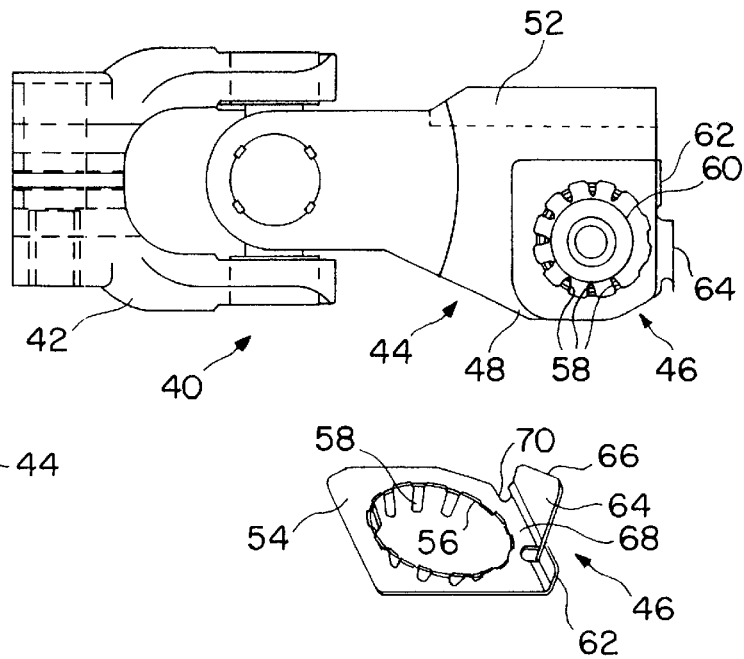
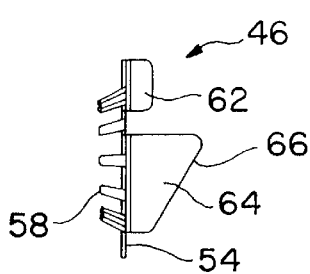
FIG. 7
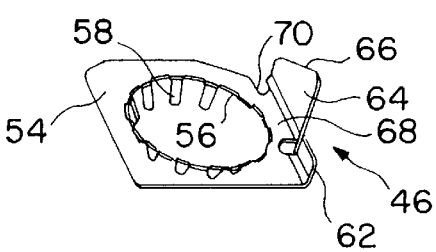
FIG. 8
FIG. 9
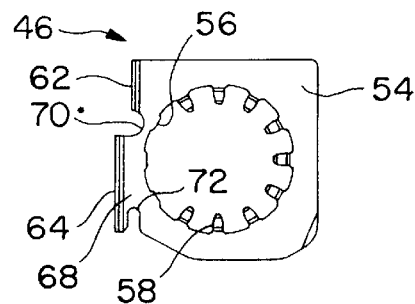
FIG. 10
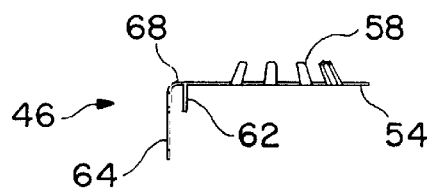
FIG. 11

STEERING SHAFT RETAINING CLIP

BACKGROUND OF THE INVENTION

This invention relates generally to steering column components and, more particularly, to a clip for holding a steering shaft to a slap yoke.

When coupling a steering column shaft to a universal joint or other steering component, a slap yoke is often preferred because the steering shaft can be inserted into the slap yoke "laterally". That is, the steering shaft can be inserted by moving it radially into the slap yoke from a position with the steering shaft roughly parallel to the slap yoke, with ends of the steering shaft and slap yoke overlapping each other. After the steering shaft is within the slap yoke, a bolt is usually used to lock the steering shaft in place.

When the steering column is assembled, the steering shaft must be held in place, and the nut of the bolt must be kept from turning, while the bolt is inserted and rotated to retain the steering shaft in the slap yoke. This is difficult for one person to do, especially when the steering column is in a confined and difficult to reach space, such as, for example, when the steering column is assembled under the dash panel of an automobile. To assist someone assembling the steering column, various slap yoke clips have been proposed.

One such slap yoke clip, illustrated in the drawing figures, wraps around a U-shaped perimeter of a slap yoke and is held in place by tabs that wrap around edges of the slap yoke at the open part of the slap yoke. An additional tab provides a deformable latch mechanism to hold the steering shaft in place, and other tabs hold the head of a cam bolt in place. However, that previously proposed clip requires substantial material and space. Additionally, the clip may not adequately retain the cam bolt, making assembly of the steering column more difficult.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a slap yoke clip for use with a slap yoke having a U-shaped cross section and slap yoke side portions including an aperture for receiving a transverse retaining bolt. A side portion of the slap yoke clip is configured to fit over a side portion of the slap yoke and has retaining means for engaging a nut of the transverse retaining bolt to retain the slap yoke clip on the slap yoke. An abutment portion of the slap yoke clip extends from the slap yoke clip side portion for abutting a surface of the slap yoke to prevent rotation of the slap yoke clip with respect to the slap yoke. An elastically deformable latch portion of the slap yoke clip extends from the slap yoke clip side portion, at an angle thereto, for elastically deforming when a steering shaft is laterally inserted into the slap yoke and for returning to a relatively undeformed condition after insertion of the steering shaft into the slap yoke to prevent exit of the steering shaft from the slap yoke.

In another aspect of the invention, this is accomplished by providing a method for assembling a slap yoke to a steering shaft, utilizing a slap yoke clip.

The foregoing and other aspects will become apparent from the following detailed description of the invention when considered in conjunction with the accompanying drawing figures.

BRIEF DESCRIPTION OF THE DRAWING FIGURES

FIG. 6 is an end view of a slap yoke and slap yoke clip illustrating an embodiment of the present invention;

FIG. 7 is an end view of the slap yoke and slap yoke clip of FIG. 6, as seen from the right hand side of FIG. 6;

FIG. 8 is a pictorial view of the slap yoke clip of FIG. 6; and

FIGS. 9, 10 and 11 are enlarged end, side and bottom views, respectively, corresponding to the orientation in FIG. 6, of the slap yoke clip of FIG. 6.

DETAILED DESCRIPTION

Figure 1:
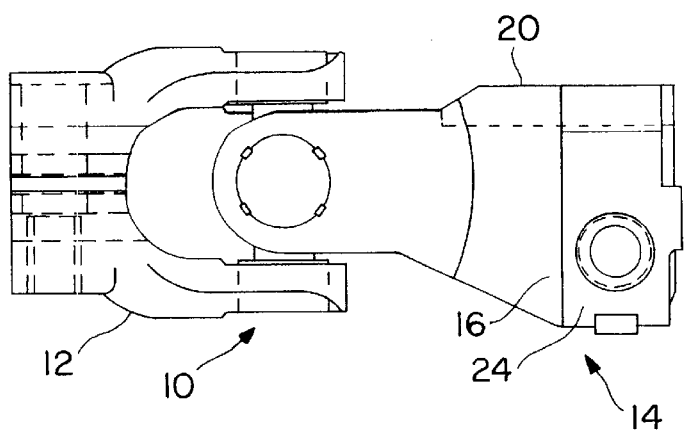
FIG. 1 is a lateral view of a universal joint including a slap yoke and slap yoke clip illustrating the prior art.
Figure 2:
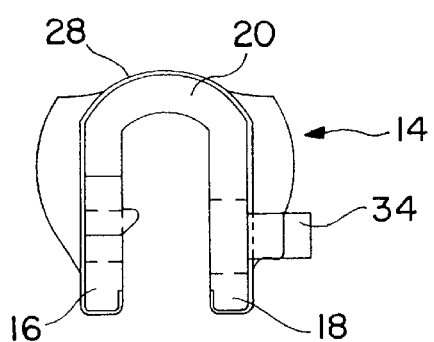
FIG. 2 is an end view of the prior art slap yoke and slap yoke clip of FIG. 1, as seen from the right hand side of FIG. 1.

Referring now to the drawings, FIG. 1 illustrates a universal joint 10 with a conventional yoke 12 and a slap yoke 14 according to the prior art. Slap yoke 14 has a U-shaped cross section, as illustrated in FIG. 2, with apertured side portions 16 and 18 joined by a curved connecting portion 20 and defining an opening into which a steering shaft, not shown, can be inserted laterally, e.g., from below the slap yoke 14.

Figure 3:
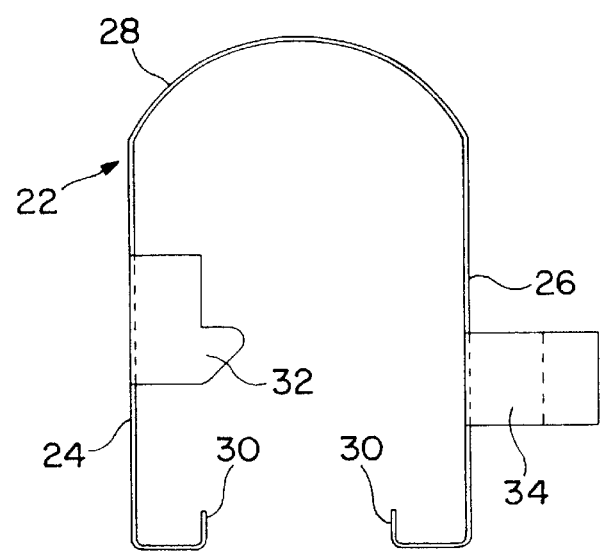
FIGS. 3, 4 and 5 are enlarged end, side and bottom views, respectively, corresponding to the orientation in FIG. 1, of the prior art slap yoke clip of FIGS. 1 and 2.
Figure 4:
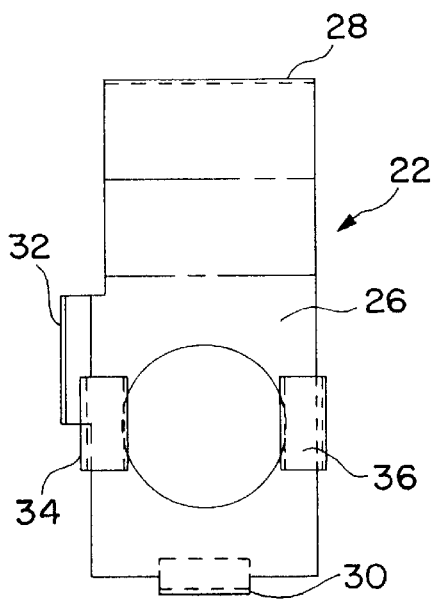
Figure 5:
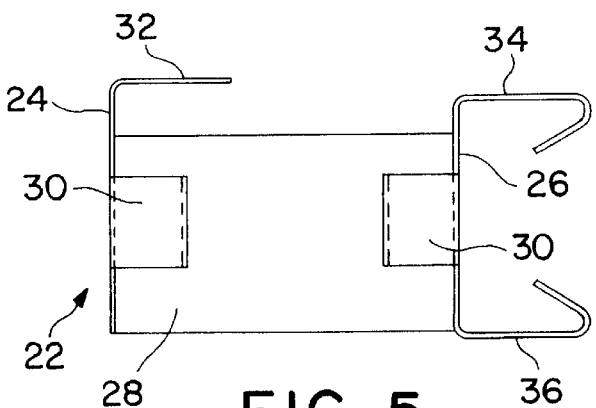

As illustrated in FIGS. 3 through 5, a slap yoke clip 22 wraps around slap yoke 14 with side portions 24 and 26 that overly slap yoke side portions 16 and 18 and with a connecting portion 28 that overlies slap yoke connecting portion 20. Slap yoke clip 22 includes retention tabs 30 that wrap around edges of slap yoke side portions 16 and 18 to retain the slap yoke clip 22 to slap yoke 14. A deformable latch portion 32 is provided to engage the steering shaft, and two spring tabs 34 and 36 are provided to hold a head of a cam bolt that is to be inserted in the apertures of the side portions 24 and 26.

FIG. 6 illustrates a universal joint 40 with a conventional yoke 42, a slap yoke 44 similar to slap yoke 14, and a slap yoke clip 46 according to an embodiment of the present invention, illustrated pictorially in FIG. 8. Slap yoke 44 has a U-shaped cross section, as illustrated in FIG. 7, with apertured side portions 48 and 50 joined by a curved connecting portion 52 and defining an opening into which a steering shaft, not shown, can be inserted laterally, e.g., from below the slap yoke 44.

As illustrated in FIGS. 8 through 11, slap yoke clip 46 has a side portion 54 that is configured to fit over slap yoke side portion 48. Side portion 54 has an aperture 56 with retention tabs 58 that extend inward at an angle to securely grip a nut 60 that is already fixed to slap yoke 44 by staking, welding or other known fixing method. Retention tabs 58 may of various shapes, depending on the configuration of nut 60. For convenience, nut 60 may have a round perimeter, as shown, rather than a more conventional perimeter.

Slap yoke clip 46 has an abutment portion 62 that extends from slap yoke side portion 54 for abutting a surface of slap yoke 44 to prevent rotation of slap yoke clip 46 with respect to slap yoke 44. Abutment portion 62 may be of various configurations, depending on the surface of the slap yoke that it is designed to abut. In the illustrated embodiment, for example, abutment portion 62 is a simple rectangular tab that extends at a right angle from slap yoke clip side portion 54 and wraps around an end surface of slap yoke side portion 48.

An elastically deformable latch portion 64 of slap yoke clip 46, extends from slap yoke clip side portion 54 for elastically deforming when a steering shaft is laterally inserted into the slap yoke and for returning to a relatively undeformed condition after insertion of the steering shaft into the slap yoke to prevent exit of the steering shaft from the slap yoke. Latch portion 64 may extend at a right angle from slap yoke side portion 48, as illustrated, and may have an angled abutment surface 66.

In the illustrated embodiment, latch portion 64 includes an extension of slap yoke clip side portion 54 beyond slap yoke side portion 48 to provide a deflection arm 68 to facilitate elastic deformation of latch portion 64. Relief portions 70 and 72 of the illustrated embodiment of slap yoke clip 46 define a narrowed width of deflection arm 68, further facilitating elastic deformation of latch portion 64. Additionally, retention tabs 58 may be omitted adjacent to latch portion 64, as illustrated, to allow slap yoke clip side portion 54 to elastically deform during insertion of the steering shaft.

From the above description, it will be apparent that the present invention provides a simple and convenient retention of a steering shaft within a slap yoke. The slap yoke clip may be formed of a polymer or of a single piece of sheetmetal that is pierced, pressed and/or folded and heat treated to facilitate elastic deformation. The slap yoke clip of the present invention allows use of a standard bolt in place of a more expensive cam bolt. The slap yoke clip requires considerably less material than prior art slap yoke clips and requires much less space than prior art slap yoke clips.

Having described the invention, what is claimed is:

1. A slap yoke assembly comprising:
   a slap yoke having a U-shaped cross section, slap yoke side portions including an aperture for receiving a transverse retaining bolt and a slap yoke end surface extending in a given plane; and
   a slap yoke clip comprising:
   a slap yoke clip side portion configured to fit over one of the side portions of the slap yoke;
   the side portion of the slap yoke clip having retaining means for engaging a nut of the transverse retaining bolt to retain the slap yoke clip on the slap yoke;
   an abutment portion of the slap yoke clip extending from the slap yoke clip side portion at an angle thereto in abutting contact with the end surface of the slap yoke to prevent rotation of the slap yoke clip with respect to the slap yoke; and
   an elastically deformable latch portion of the slap yoke clip extending from the slap yoke clip side portion, at an angle thereto, parallel to and spaced from the given plane, for elastically deforming when a steering shaft is laterally inserted into the slap yoke and for returning to a relatively undeformed condition after insertion of the steering shaft into the slap yoke to prevent exit of the steering shaft from the slap yoke.

2. A slap yoke assembly according to claim 1 wherein the slap yoke clip side portion has an aperture, having a given perimeter, for receiving the transverse slap yoke retaining bolt, and wherein the retaining means is a plurality of inwardly directed tabs along at least a portion of the perimeter of the side portion aperture.

3. A slap yoke assembly according to claim 2 wherein the inwardly directed tabs are located only along a portion of the perimeter of the slap clip yoke clip side portion aperture away from the slap yoke clip latch portion such that the side portion of the slap yoke clip is free to deflect during insertion of a steering shaft into the slap yoke.

4. A slap yoke assembly according to claim 1 wherein the slap yoke clip latch portion includes an extension of the slap yoke clip side portion to provide a deflection arm to facilitate elastic deformation of the slap yoke clip latch portion.

5. A slap yoke assembly according to claim 1 wherein the abutment portion of the slap yoke clip is a tab extending at a right angle to slap yoke clip side portion.

6. A slap yoke assembly according to claim 1 wherein the slap yoke clip latch portion has an angled abutment surface for engaging the steering shaft during insertion of the steering shaft into the slap yoke.

7. A slap yoke assembly according to claim 1 wherein the slap yoke clip is formed of a single sheet of sheetmetal.

* * * * *